United States Patent [19]

Adam

[11] 4,328,159
[45] May 4, 1982

[54] ANTHRAQUINONE COMPOUNDS AND MIXTURES THEREOF

[75] Inventor: Jean-Marie Adam, St. Louis, France

[73] Assignee: Ciba-Geigy Corporation, Ardsley, N.Y.

[21] Appl. No.: 41,278

[22] Filed: May 21, 1979

[30] Foreign Application Priority Data

Jun. 2, 1978 [CH] Switzerland .................. 6075/78

[51] Int. Cl.³ .................................. C07C 143/665
[52] U.S. Cl. ........................................... 260/374
[58] Field of Search ................ 260/371, 378, 381, 374

[56] References Cited

U.S. PATENT DOCUMENTS

| Re. 27,800 | 10/1973 | Schwander et al. | 260/381 |
| 2,226,909 | 12/1940 | Basel | 260/374 |
| 2,779,772 | 1/1957 | Frey et al. | 260/371 |
| 2,870,173 | 1/1959 | Hindermann et al. | 260/374 |
| 2,889,323 | 6/1959 | Heslop | 260/374 |
| 3,657,284 | 4/1972 | Booth et al. | 260/381 |
| 4,141,682 | 2/1979 | Greenhalgh et al. | 260/378 |
| 4,146,363 | 3/1979 | Harms et al. | 260/374 |

FOREIGN PATENT DOCUMENTS

| 457386 | 2/1937 | United Kingdom . |
| 903590 | 8/1962 | United Kingdom . |
| 945806 | 1/1964 | United Kingdom . |
| 1017616 | 1/1966 | United Kingdom . |
| 1107515 | 3/1968 | United Kingdom . |

OTHER PUBLICATIONS

*AATCC Technical Manual,* pp. 111–113, 1979, AATCC Research Triangle Park, N.C.

*Primary Examiner*—Winston A. Douglas
*Assistant Examiner*—Raymond Covington

*Attorney, Agent, or Firm*—Edward McC. Roberts

[57] ABSTRACT

There are described new anthraquinone compounds, and mixtures thereof, of the formula

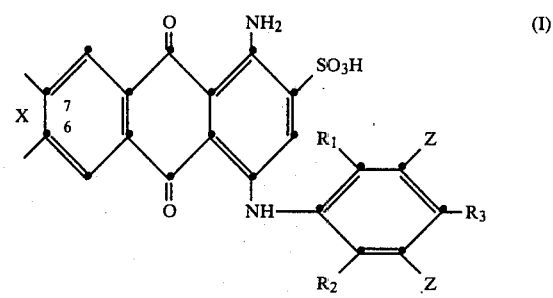

in which
X is a halogen atom which is in the 6- or 7-position of the anthraquinone molecule, $R_1$ and $R_2$ independently of one another are each an alkyl group, $R_3$ is hydrogen or an alkyl group, and the Z's independently of one another are each hydrogen, a fibre-reactive group bound by way of an amino group, or they are each a water-solubilising group, or the group —$CH_2NH$—$CO$—Y in which Y is an alkyl or alkenyl group which is unsubstituted or is mono- or disubstituted by halogen, or it is an unsubstituted or substituted phenyl group, with the proviso that if one Z is a fibre-reactive group bound by way of an amino group, the other Z is a water-solubilising group; processes for producing these compounds; and their use as dyes for dyeing or printing natural or synthetic textile materials dyeable with acid dyes or with fibre-reactive dyes, such as polyamide materials, wool and cellulose materials.

10 Claims, No Drawings

NEW ANTHRAQUINONE COMPOUNDS AND MIXTURES THEREOF

The present invention relates to new anthraquinone compounds and to mixtures thereof, to processes for producing these compounds, to their use as dyes for dyeing or printing natural or synthetic textile materials, and to the textile material dyed or printed with these new anthraquinone dyes.

In the form of the free acid, the new anthraquinone compounds correspond to the formula I

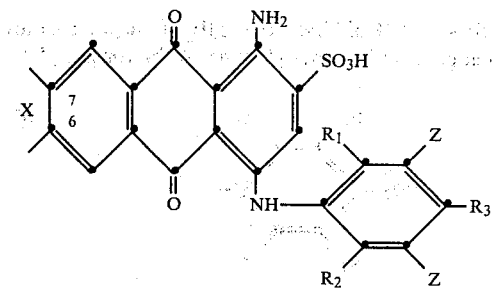

wherein
X is a halogen atom which is in the 6- or 7-position of the anthraquinone molecule, $R_1$ and $R_2$ independently of one another are each an alkyl group, $R_3$ is hydrogen or an alkyl group, and the Z's independently of one another are each hydrogen, a fibre-reactive group bound by way of an amino group, or they are each a water-solubilising group, or the group $-CH_2-NH-CO-Y$ in which Y is an alkyl or alkenyl group which is unsubstituted or is mono- or disubstituted by halogen, or it is an unsubstituted or substituted phenyl group, with the proviso that if one Z is a fibre-reactive group bound by way of an amino group, the other Z is a water-solubilising group.

Preferred anthraquinone compounds consist of a mixture of a 6-halogenoanthraquinone compound and a 7-halogenoanthraquinone compound.

As a halogen atom, X is for example a fluorine, chlorine or bromine atom. In preferred anthraquinone compounds, X is the chlorine atom.

As an alkyl group, $R_1$, $R_2$ and $R_3$ independently of one another are each a straight-chain or branched-chain alkyl group having in particular 1 to 4 carbon atoms. They are for example the methyl, ethyl, n- and isopropyl group, or the n-, sec- or tert-butyl group. In preferred anthraquinone compounds, $R_1$, $R_2$ and $R_3$ are each the same straight-chain alkyl group having 1 to 4 carbon atoms, especially the $CH_3$ group.

As a fibre-reactive group bound by way of an amino group, Z is a group which contains one or more fibre-reactive groups, or substituents that can be split off, which, on application of the dyes to cellulose materials in the presence of acid-binding agents and optionally under the action of heat, are able to react with the hydroxyl groups of the cellulose, or on application to polyamide fibres or wool are able to react with the $NH_2$ groups of these fibres, to form in both cases covalent bonds. Large numbers of fibre-reactive groupings of this type are known from the literature.

Suitable reactive groups which contain at least one substituent which can be split off and which is bound to a heterocyclic radical or to an aliphatic radical are, inter alia, reactive groups which contain at least one reactive substituent bound to a 5- or 6-membered heterocyclic ring, such as to a monoazine, diazine, triazine, for example pyridine, pyrimidine, pyridazine, pyrazine, thiazine, oxazine or asymmetric or symmetric triazine ring; or to a ring system of that kind, which contains one or more fused-on aromatic rings, such as a quinoline, phthalazine, quinazoline, quinoxaline, acridine, phenazine and phenanthridine ring system.

To be mentioned among the reactive substituents on the heterocycle are for example: halogen such as chlorine, bromine or fluorine, ammonium, including hydrazinium, sulfonium, sulfonyl, azido-($N_3$), thiocyanate, thioether, oxyether, sulfinic acid and sulfonic acid. There are to be mentioned in particular for example: mono- or dihalo-symmetrical-triazinyl groups, for example the 2,4-dichlorotriazinyl-6, 2-amino-4-chlorotriazinyl-6 and 2-alkylamino-4-chlorotriazinyl-6 group; mono-, di- or trihalopyrimidinyl groups, such as the 2,4-dichloropyrimidinyl-6, 2,4,5-trichloropyrimidinyl-6, 2,4-dichloro-5-nitro- or -5-methyl- or -5-carboxymethyl- or -5-carboxy- or -5-cyano- or -5-vinyl- or -5-sulfo- or -5-mono-, -di- or -trichloromethyl- or -5-carboalkoxy-pyrimidinyl-6 or 2,6-dichloropyrimidine-4-carbonyl group and the 2-chloro-4-methylpyrimidine-5-carbonyl group. In addition, the 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-6-carbonyl, 2,3-dichloroquinoxaline-6-sulfonyl, 1,4-dichlorophthalazine-6-sulfonyl or -6-carbonyl, 2,4-dichloroquinazoline-7- or -6-sulfonyl or -carbonyl, 2- or 3- or 4-(4',5'-dichloropyridazon-6'-yl-1')-phenylsulfonyl or -carbonyl group, and the β-(4',5'-dichloropyridazon-6'-yl-1')-ethylcarbonyl group. Pyrimidine groups containing sulfonyl groups, such as the 2-carboxymethylsulfonyl-pyrimidinyl-4, 2-methylsulfonyl-6-methyl-pyrimidinyl-4, 2-methylsulfonyl-6-ethyl-pyrimidinyl-4, 2-phenylsulfonyl-5-chloro-6-methyl-pyrimidinyl-4, 2,6-bis-methylsulfonyl-pyrimidinyl-4, 2,6-bis-methylsulfonyl-5-chloropyrimidinyl-4, 2,4-bis-methylsulfonylpyrimidine-5-sulfonyl, 2-methylsulfonyl-pyrimidinyl-4, 2-phenylsulfonyl-pyrimidinyl-4, 2-trichloromethylsulfonyl-6-methyl-pyrimidinyl-4 and 2-methylsulfonyl-5-chloro-6-methyl-pyrimidinyl-4-groups. Triazine rings containing ammonium groups, such as the 2-trimethylammonium-4-phenylamino- or -4-(o-, m- or p-sulfophenyl)-aminotriazinyl-6, 2-(1,1-dimethylhydrazinium)-4-phenylamino- or -4-(o-, m- or p-sulfophenyl)-aminotriazinyl-6, 2-isopropylidene-1,1-dimethyl)-hydrazinium-4-phenylamino- or -4-(o-, m- or p-sulfophenyl)-aminotriazinyl-6, 2-N-aminopyrrolidinium- or 2-N-aminopiperidinium-4-phenylamino- or -4-(o-, m- or p-sulfophenyl)-aminotriazinyl-6 groups, also the 4-phenylamino- or 4-(sulfophenylamino)-triazinyl-6 groups, which contain in the 2-position, bound by way of a quaternary nitrogen bond, 1,4-bis-aza-bicyclo-[2,2,2]-octane or 1,2-bis-azabicyclo-[0,3,3]-octane, 2-pyridinium-4-phenylamino- or -4-(o-, m- or p-sulfophenyl)-aminotriazinyl-6 groups, as well as corresponding 2-oniumtriazinyl-6 groups which are substituted in the 4-position by alkylamino groups, such as methylamino or ethylamino groups, or by β-hydroxyethylamino groups, or alkoxy groups, such as methoxy or ethoxy groups, or by aryloxy groups, such as phenoxy or sulfophenoxy groups; 2-chlorobenzothiazole-5- or -6-carbonyl or -5- or -6-sulfonyl, 2-arylsulfonyl- or -alkylsulfonylbenzothiazole-5 or -6-carbonyl or -5- or -6-sulfonyl, such as 2-methylsulfonyl- or 2-ethylsulfonyl-benzothiazole-5- or -6-sulfonyl or -carbonyl, 2-phenylsulfonyl-benzothiazole-5- or -6-sulfonyl or -carbonyl and the corresponding 2-sulfonylbenzothiazole-5- or -6-carbonyl or -sulfonyl derivatives, all containing sulfo groups in the fused-on benzene ring, 2-chlorobenzoxazole-5- or -6-carbonyl or -sulfonyl groups, 2-chlorobenzimidazole-5- or -6-carbonyl or -sulfonyl, 2-chloro-1-methyl-benzimidazole-5- or -6-carbonyl or -sulfonyl, 2-chloro-4-methylthiazole-(1,3)-5-carbonyl or -4- or -5-sulfonyl groups, or N-oxide of 4-chloro- or 4-nitroquinoline-5-carbonyl.

Reactive groups suitable especially for polyamide but in particular for wool are: chloroacetyl, bromoacetyl, α,β-dichloro- or α,β-dibromopropionyl, α-chloro- or α-bromoacroyl or 2,4,6-trifluoropyrimidyl-5 or 2,4-difluorotriazinyl-6 groups and also fluorotriazinyl groups of the formula

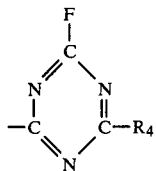

in which $R_4$ is an unsubstituted or substituted amino group, or an optionally etherified hydroxyl or thio group, such as the $NH_2$ group, an amino group mono- or di- substituted by $C_1$-$C_4$ alkyl groups, or it is a $C_1$-$C_4$ alkoxy group, a $C_1$-$C_4$ alkylmercapto group, arylamino, especially phenylamino, or phenylamino substituted by methyl, methoxy, chlorine and in particular sulfo, or it is phenoxy or mono- or disulfophenyloxy.

Particularly preferred reactive groups Z are in particular fibre-reactive groups which are aliphatic groups, such as especially the α-bromacryloyl and the α,β-dibromopropionyl group. The former can either be introduced with the aid of bromoacrylic acid chloride, or be obtained from the α,β-dibromopropionyl group by splitting off hydrogen bromide. The same applies also in the case of the α-chloroacrylic group. Likewise of interest is the 2,4-difluorotriazinyl-(6) group or the 2,4-dichloropyrimidyl-6 group.

As a water-solubilising group, Z is in particular the $SO_3H$ group.

In preferred anthraquinone compounds, one Z is hydrogen and the other Z likewise hydrogen, or a group of the formula —$CH_2$—NH—CO—Y in which Y is the $CH_2Cl$ group or a phenyl group; or one Z is a fibre-reactive group, especially an α,β-dibromopropionyl group, bound by way of an amino group, and the other Z is the $SO_3H$ group. Of interest are also anthraquinone compounds in which each Z is a group of the formula —$CH_2$NH—CO—Y, for example each Z is the group —$CH_2$—NH—CO—$CH_2Cl$; or wherein one Z is the group $CH_2$ $NHCOCH_2Cl$ and the other Z is the group $CH_2NHCO.C_6H_5$. Furthermore, suitable compounds are those wherein one Z is the $SO_3H$— group, and the other Z is the group $CH_2NHCOCH_2Cl$.

Suitable substituents of the phenyl group Y are for example halogen or alkyl. The phenyl group is advantageously unsubstituted.

The new anthraquinone compounds, and mixtures thereof, of the formula I are water-soluble blue compounds which have good substantivity on textile materials, especially on polyamide material, and also good fastness to light and to wet processing. The new anthraquinone compounds, and mixtures thereof, of the formula I are obtained by reacting anthraquinone compounds, or mixtures thereof, of the formula II

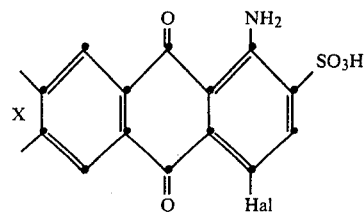

in which X and "Hal" independently of one another are each halogen, with a phenylamine of the formula III

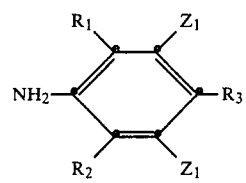

in which $R_1$, $R_2$ and $R_3$ have the meanings given in the foregoing, the $Z_1$'s independently of one another are each hydrogen, a water-solubilising group or the amino group; and then reacting the reaction product, in the case where Z is the amino group, with a compound introducing a fibre-reactive group, or, in the case where Z is hydrogen, optionally with a compound introducing the group —$CH_2$—NH—CO—Y; and optionally sulfonating the product obtained.

Compounds introducing fibre-reactive groups are those on which the stated fibre-reactive groups are based, in general halides, particularly chlorides, of the components mentioned, and the condensation reaction is performed especially in an aqueous medium, but also in an organic medium, and in a weakly acid pH range, in the presence of agents splitting off acid. Suitable reactive compounds are, just to mention a few, for example α,β-dibromopropionyl chloride, 2,4-difluoro-6-aminotriazine, 2,4-difluoro-6-methylaminotriazine, 2,4-difluoro-6-ethylaminotriazine, 2,4-difluoro-6-phenylaminotriazine, 2,4-difluoro-6-(2',3'- or 4'-sulfophenyl)-aminotriazine, 2,4-difluoro-6-(2',4'- or 3',4'- or 2',5'- or 4',5'-disulfophenyl)-aminotriazine, 2,4-difluoro-6-dimethylaminotriazine, 2,4-difluoro-6-methoxytriazine, 2,4-difluoro-6-(β-methoxyethoxy)-triazine, 2,4-difluoro-6-methylmercaptotriazine and 2,4-difluoro-6-phenylmercaptotriazine.

It it is desired that the final product of the formula I contains in the phenyl nucleus at one Z position or at both Z positions the initially mentioned substituent of the formula —$CH_2$—NH—CO—Y, it is advantageous to introduce this substituent before sulfonation. The introduction of a group of this kind is performed according to Tscherniak-Einhorn by reacting the anthraquinone compound or the mixture of anthraquinone compounds, obtained from the compound II with the compound III, with an N-methylolamide which carries on the N atom the group —COY, in an acid medium, preferably in concentrated sulfuric acid. Suitable N-methylolamides are for example N-methylolbenzamide, N-methylol-2,4-dichlorobenzamide, N-methylol-2-chlorobenzamide and N-methylol-4-chlorobenzamide.

The anthraquinone compounds of the formula II and the phenylamines of the formula III are known.

Suitable anthraquinone compounds of the formula II are for example: 1-amino-4-bromo-6-chloroanthraquinone-2-sulfonic acid, 1-amino-4-bromo-7-chloroanthraquinone-2-sulfonic acid, and a mixture (1:1) of 1-amino-4-bromo-6-chloroanthraquinone-2-sulfonic acid and 1-amino-4-bromo-7-chloroanthraquinone-2-sulfonic acid.

Phenylamines of the formula III to be mentioned are for example: 2,4,6-trimethylaniline, 2-methyl-6-ethylaniline, 2,6-dimethylaniline and 5-amino-2,4,6-trimethylaniline-3-sulfonic acid.

The condensation reaction of the compound of the formula II with the compound of the formula III is performed in a known manner, for example in a mixture of water and organic medium (for example cellosolve, or alcohols such as methanol or ethanol) at a temperature of about 70° to 100° C., depending on the boiling point of the employed solvent, and in the presence of a catalyst, such as copper powder or copper salt, and of a base, such as NaHCO₃.

The anthraquinone compounds of the formula II can be produced by various methods. They are obtained for example by amination of 1,6- and/or 1,7-dihaloanthraquinone according to the procedure described in German patent specification No. 2,604,830, and subsequent sulfonation in the 2-position, for example with chlorosulfonic acid, and halogenation, particularly bromination, in the 4-position. Another possible method of producing these compounds is by nitrating in the 1-position an anthraquinone compound monosulfonated in the 6- and/or 7-position, exchanging then the sulfo group in the 6- and/or 7-position for halogen, especially chlorine, reducing the nitro group in the 1-position to the amino group, sulfonating this 1-amino-6/7-halogenoanthraquinone compound in the 2-position as described, and subsequently halogenating the resulting product in the 4-position to the anthraquinone compound of the formula II.

The anthraquinone compounds, and mixtures thereof, of the formula I are used in particular as dyes for dyeing or printing natural or synthetic textile materials which are dyeable with acid dyes or fibre-reactive dyes, especially polyamide materials, such as nylon and wool, and cellulose materials, by conventional methods, such as by the exhaust process or continous process. These materials can be in the most varied forms of make-up, such as fibres, filaments, fabrics, knitwear, piece-goods and finished articles, such as shirts and pullovers.

The dyeings or printings obtained on these materials are distinguished by pure blue shades having a good colour in artificial light, and by good fastness properties, such as good fastness to wet processing, to light and to ozone.

One advantage of the invention is that it is possible to use as starting compounds for producing the anthraquinone compounds according to the invention waste products which were hitherto worthless (for example residues from anthraquinone nitrations).

The invention is further illustrated by the Examples which follow, without being limited to them. The term 'parts' denotes parts by weight, and the temperatures are given in degrees Centigrade. The designation 6/7-chloroanthraquinone signifies that the product concerned is a mixture of a 6-chloroanthraquinone and a 7-chloroanthraquinone compound. The anthraquinone compounds can be in the free acid form, or in the form of an alkali salt, for example in the form of the ammonium, sodium, potassium of lithium salt.

EXAMPLE 1

43.9 parts of the sodium salt of the mixture of 1-amino-4-bromo-6-chloroanthraquinone-2-sulfonic acid and 1-amino-4-bromo-7-chloroanthraquinone-2-sulfonic acid are stirred to a paste together with 20 parts of mesidine and 20 parts of sodium bicarbonate in 250 parts of water and 80 parts of methyl alcohol. This mixture is heated to 75° and, with thorough stirring, 0.6 part of copper powder is sprinkled in. The mixture is stirred at 80°–85° for 15 hours to complete the reaction, and the excess mesidine is then expelled with steam. To the residue are added 300 parts of methyl alcohol, and the hot alcoholic-aqueous dye solution is separated from the copper catalyst by filtration. The filtrate is acidified with dilute hydrochloric acid, whereupon the dye acid precipitates. This is filtered off with suction, and subsequently washed with dilute hydrochloric acid. The suction filter residue is suspended in 300 parts of water; the pH value is then adjusted to 7.5 with dilute aqueous sodium hydroxide solution, the temperature is raised to 60°, and 300 parts of a 20% aqueous sodium chloride solution are added, whereupon the sodium salt of the dye of the formula

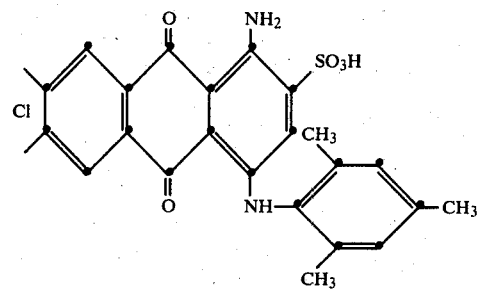

is obtained, and is filtered off and dried. The dye thus obtained dyes wool and synthetic polyamide fibres, from an acetic acid to sulfuric acid bath, in level, greenish-blue shades having good fastness properties.

Similarly blue dyes having indentically good dyeing properties are obtained by using in the above Example 20 parts of 2-methyl-6-ethylaniline or 18 parts of 2,6-dimethylaniline instead of 20 parts of mesidine.

The 1-amino-4-bromo-6/7-chloroanthraquinone-2-sulfonic acid used is obtained by reaction of 1,6/1,7-dichloroanthraquinone with ammonia in an autoclave according to the German patent specification No. 2,604,830, sulfonation of the formed 1-amino-6/7-chloroanthraquinone with chlorosulfonic acid in dichlorobenzene, and bromination in the 4-position.

EXAMPLE 2

29.6 parts of the sodium salt of the dye according to Example 1 are dissolved at 0°–5° in 280 parts of 96% sulfuric acid, and the solution is mixed with 9.4 parts of N-methylolbenzamide. The mixture is stirred at 0°–5° for 15 hours, whereupon it is poured onto ice, and the dye is separated, in the customary manner, as sodium salt. The resulting dye of the formula

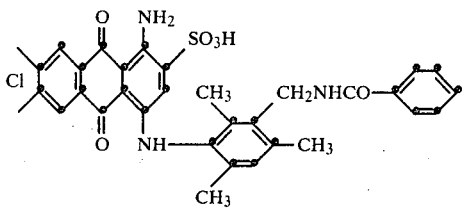

dyes wool and synthetic polyamide fibres, from a weakly acid bath, in blue shades having good fastness to wet processing.

Dyes which dye wool and polyamide likewise in fast blue shades are obtained by using in the condensation reaction 14 parts of N-methylol-2,4-dichlorobenzamide or 11.6 parts of N-methylol-2-chlorobenzamide or 11.6 parts of N-methylol-4-chlorobenzamide in place of N-methylolbenzamide, under otherwise the same conditions.

EXAMPLE 3

29.6 parts of the sodium salt of the dye according to Example 1 are dissolved at 15° to 20° in 280 parts of 96% sulfuric acid, and into this solution are introduced 8.2 parts of N-methylolchloroacetamide. The mixture is stirred for 15 hours at a temperature of 15° to 20°, and is then poured onto ice. The dye which has precipitated is filtered off with suction and suspended in water; the pH value of the suspension obtained is carefully adjusted to 7 with sodium hydroxide solution, and the dye is then precipitated, with sodium chloride, as sodium salt.

The anhydrous dye of the formula

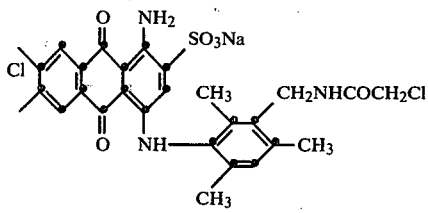

dyes wool, from a weakly acid bath, in neutral blue shades. The wool dyeings have good fastness to wet processing.

Dyes which dye wool likewise in fast blue shades are obtained by using in the above process 30.3 parts of the dye obtained by condensation of 1 mol of 1-amino-4-bromo-6/7-chloroanthraquinone-2-sulfonic acid with 1 mol of 2,4-dimethyl-6-ethylaniline, or 32 parts of the sodium salt of the dye obtained by condensation of 1 mol of 1-amino-4-bromo-6/7-chloroanthraquinone-2-sulfonic acid with 1 mol of 2,4,6-triethylaniline, with otherwise the same procedure.

EXAMPLE 4

58.8 parts of 1-amino-4-(5'-amino-2',4',6'-trimethylphenylamino)-6/7-chloroanthraquinone-2,3'-disulfonic acid, obtained by condensation of 1 mol of 1-amino-4-bromo-6/7-chloroanthraquinone-2-sulfonic acid with 1 mol of 5-amino-2,4,6-trimethylaniline-3-sulfonic acid, are dissolved in 500 parts of water at 0°–5°. After the addition of 14.3 parts of sodium bicarbonate, there are slowly added dropwise, with stirring, 31.2 parts of α,β-dibromopropionyl chloride, in the course of which the reaction mixture is held below 5° by the addition of ice. After completion of acylation, the dye of the formula

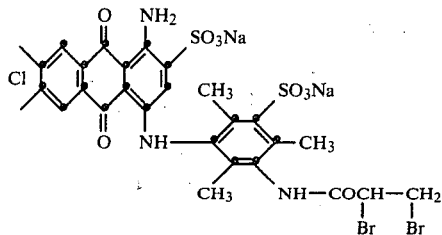

is salted out with 100 parts of sodium chloride; the dye is subsequently separated by filtration and dried at 80°. A dark-blue powder which dissolves in water and dyes wool in brilliant blue shades having fastness to wet processing is obtained.

A reactive dye having similarly good dyeing properties is obtained by using 27.8 parts of α-bromoacrylic acid bromide instead of 31.2 parts of α,β-dibromopropionyl chloride, the procedure otherwise being as described in this Example.

EXAMPLE 5

A dye bath is prepared from 4000 parts of water, 4 parts of ammonium acetate, 2 parts of the dye according to Example 1 and acetic acid in an amount sufficient to bring the pH value of the bath to 4.5. Into the dye bath obtained are introduced 100 parts of a synthetic polyamide tricot; the bath is then heated within half an hour to boiling temperature, and the material is dyed at 100° for 45 minutes. A greenish-blue dyeing having good fastness properties is obtained.

What is claimed is:

1. Anthraquinone compounds, and mixtures thereof, of the formula I

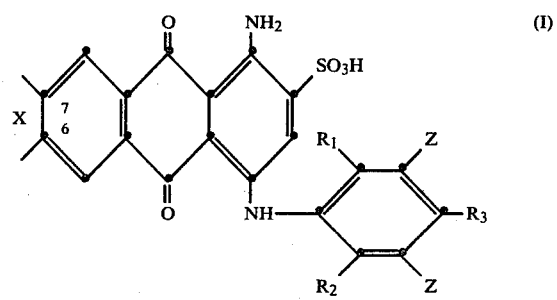

wherein

X is a halogen atom which is in the 6- or 7-position of the anthraquinone molecule, $R_1$ and $R_2$ independently of one another are each an alkyl group, $R_3$ is hydrogen or an alkyl group, one Z is the group —$CH_2$—NH—CO—Y in which Y is an alkyl or alkenyl group which is unsubstituted or is mono- or disubstituted by halogen or an unsubstituted or substituted phenyl group, the other Z is hydrogen or —$CH_2$—NH—CO—Y.

2. Anthraquinone compounds according to claim 1, which consist of a mixture of a 6-halogenoanthraquinone compound and a 7-halogenoanthraquinone compound of the formula I according to claim 1.

3. Anthraquinone compounds according to claims 1 and 2, wherein X is the chlorine atom.

4. Anthraquinone compounds according to claim 1, wherein $R_1$, $R_2$ and $R_3$ are each the same straight-chain alkyl group having 1 to 4 carbon atoms.

5. Anthraquinone compounds according to claim 4, wherein $R_1$, $R_2$ and $R_3$ are each the $CH_3$ group.

6. Anthraquinone compounds according to claim 1, wherein one Z is hydrogen, and the other Z is a group of the formula $-CH_2-NH-CO-Y$ in which Y is the $-CH_2Cl$ group or phenyl group.

7. A process for producing anthraquinone compounds, and mixtures thereof, of the formula I according to claim 1 which process comprises reacting anthraquinone compounds, or mixtures thereof, of the formula II

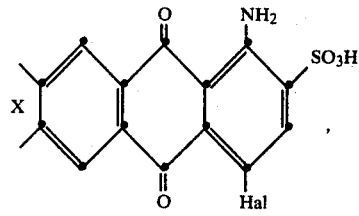

in which X and "Hal" independently of one another are each halogen, with a phenylamine of the formula III

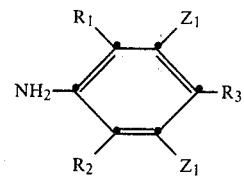

in which $R_1$, $R_2$ and $R_3$ have the meanings given, and the $Z_1$'s are each hydrogen, and then reacting the reaction product with a compound introducing the group $-CH_2-NH-CO-Y$; and optionally sulfonating the product obtained.

8. An anthraquinone compound of the formula

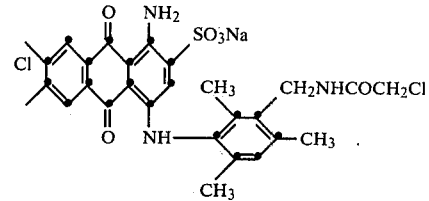

9. An anthraquinone compound of the formula

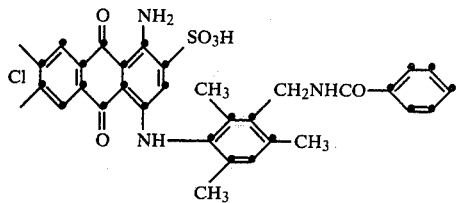

10. Use of the anthraquinone compounds, and of mixtures thereof, of the formula I according to claim 1 as dyes for dyeing or printing natural or synthetic textile materials dyeable with acid dyes or with fibre-reactive dyes, particularly polyamide materials, and also wool and cellulose materials.

* * * * *